United States Patent [19]

Ryan

[11] 4,438,413

[45] Mar. 20, 1984

[54] SERIAL MINIMUM SHIFT KEYED MODULATOR INCLUDING NOTCH AND BANDPASS FILTERS

[75] Inventor: Carl R. Ryan, Gilbert, Ariz.

[73] Assignee: Motorola Inc., Schaumburg, Ill.

[21] Appl. No.: 268,419

[22] Filed: May 29, 1981

[51] Int. Cl.³ .................. H03C 3/00; H04L 27/12
[52] U.S. Cl. ...................... 332/16 R; 375/47; 375/64
[58] Field of Search ............ 332/16 R, 16 T; 375/45, 375/46, 47, 62, 64

[56] References Cited
PUBLICATIONS

"760 Mbit/s Serial MSK Microwave Modem", Authors: Ryan, Hambley and Vogt–May 1980–IEE Transactions on Communications, vol. Com-28, No. 5, pp. 771-777.

*Primary Examiner*—Siegfried H. Grimm
*Attorney, Agent, or Firm*—Eugene A. Parsons

[57] ABSTRACT

An SMSK modulator wherein the output of a bi-phase modulator is passed through a notch filter and a band pass filter to produce an SMSK signal for transmission. The notch filter and band pass filter are constructed to simulate the output (center lobe) of an SMSK conversion filter, which is defined as a filter that converts a bi-phase shift keyed (BPSK) modulated signal into MSK.

10 Claims, 11 Drawing Figures

— PRIOR ART —

$f_0-5/4T$     $f_0-3/4T$

— PRIOR ART —

SERIAL MINIMUM SHIFT KEYED MODULATOR INCLUDING NOTCH AND BANDPASS FILTERS

BACKGROUND OF THE INVENTION

Minimum shift keyed (MSK) modulation has received considerable attention over the past decade due to its potential as a bandwidth and power efficient constant envelope modulation technique. Two generic techniques for the modulation and demodulation of MSK signals are referred to as the parallel and serial methods. Both are completely equivalent in terms of bandwidth occupancy and bit error rate (BER) performance.

The parallel method amounts to quadrature multiplexing half sinusoid pulse shaped data streams staggered by one-half symbol period on quadrature carriers. Practical implementation of MSK modems employing the parallel approach require close balancing and alignment of the in-phase and quadrature channel data signals on carriers which are themselves balanced and in-phase quadrature. Similarly, at the receiver, careful balancing and maintenance of phase quadrature is required to minimize distortion and, in particular, cross talk.

On the other hand, with the series approach, the MSK modulated signal is produced from a bi-phase modulated signal by filtering it with an appropriately designed conversion filter. The problems of balancing and maintaining phase quadrature carriers of the parallel approach are therefore replaced with the task of building the conversion filter which, ideally, has a sin (x)/x frequency response.

Various approaches have been taken to building serial MSK conversion filters, including the use of surface acoustic wave (SAW) devices. Specifically, see F. Amoroso and J. A. Kivett, "Simplified MSK Signaling Technique", *IEEE Transactions on Communications*, volume COM-25, pp. 433–441, April 1977. Such devices are limited in bandwidth to roughly ten percent of their center frequency which is, in turn, limited to a few hundred megahertz. Thus, the maximum data rates of SAW implemented MSK modems are inherently limited to well under 100 megabits per second unless special fabrication techniques are used.

SUMMARY OF THE INVENTION

The present invention pertains to a serial minimum shift keyed modulator and a method of synthesizing the conversion filter therefore including synthesizing the conversion filter with a notch filter having at least one notch lower in frequency than the carrier frequency for the bi-phase modulated carrier and a band pass filter having a band pass positioned to extend above and below the carrier frequency for the bi-phase modulator carrier. Equivalent results can be obtained with a notch at a frequency above the carrier frequency and so on throughout this discussion. The number and frequency position of notches of the notch filter and the type, center frequency, and bandwidth of the band pass filter are selected to optimize the envelope amplitude variations and the bit error rate of the MSK modulator.

It is an object of the present invention to provide a new and improved serial minimum shift keyed modulator.

It is a further object of the present invention to provide a new and improved serial minimum shift keyed modulator which is suited for high data rates in excess of 100 megabits per second, does not impose the losses inherent with SAW devices, and may be easily implemented in lumped element or distributed element form.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Conventional means of generating an MSK signal involve two parallel bit streams with symbol rates equal to half the bit rate with the bit streams offset. The bit period of each bit stream is 2T seconds, while the offset is half a bit period (T seconds). The use of two offset bit streams is also used for the generation of offset quadraphase shift keyed signaling. However, the difference between the two is that for MSK the individual pulses which compose the bit streams are sinusoidally weighted before modulation of the carrier frequency. The required amplitude and phase balance needed for a conventional MSK modulator is difficult to achieve at high data rates.

In 1976, Amoroso and Kivett (see the above referenced article) introduced a simplified means of generating the MSK signal by using a conventional bi-phase modulator followed by a linear time-invarient filter. The use of the simplified method reduces the amplitude and phase balance sensitivity requirement significantly from that required by a conventional MSK modulator. This means of generating an MSK signal has been given the name serial minimum shift keyed (SMSK) because it generates the MSK signal from a serial bit stream. A block diagram of the SMSK modulator is shown in FIG. 1.

Figure 1:
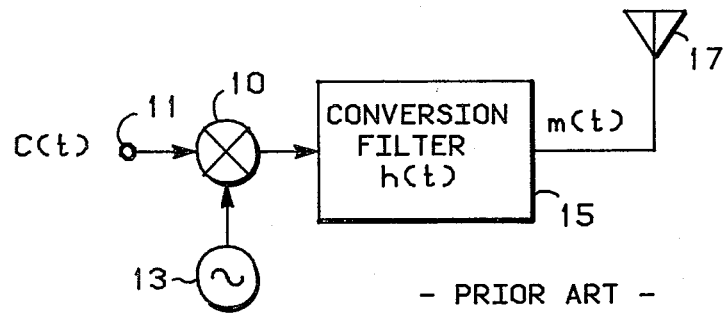
FIG. 1 is a block diagram of a prior art serial minimum shift keyed modulator.

In FIG. 1 the conventional bi-phase modulator is designated 10 and includes a first input from a terminal 11 adapted to have a serial bit stream, C(t), applied thereto. A second input to the bi-phase modulator 10 is supplied by a local oscillator 13 which supplies a signal represented by the statement:

$$\cos 2\pi \left( f_o - \frac{1}{4T} \right) t$$

The output of the bi-phase modulator 10 is supplied through a conversion filter or linear time invarient filter, 15 to a transmission antenna 17. In FIG. 1, C(t) is the serial bit stream with a bit period of T seconds, h(t) is the impulse response of the linear time invarient filter 15, and $f_o$ is the carrier frequency for the bi-phase modulated signal, which is termed the apparent carrier for MSK signal. This linear time invarient filter will be referred to throughout this disclosure as the conversion filter, since it converts a bi-phase shift keyed (BPSK) modulated signal into MSK.

The required impulse response of the conversion filter 15 is:

$$h(t) = \begin{cases} \sin 2\pi \left( f_o + \frac{1}{4T} \right) t & \text{for } 0 < t < T \\ 0 & \text{elsewhere} \end{cases}$$

The resulting output of filter 15, m(t), is found by assuming narrow band signals ($f_o \gg 1/T$). This assumption permits the complex envelope of the filtered signal to be determined by simply convolving the complex envelopes of the BPSK signal and conversion filter 15.

Figure 3:
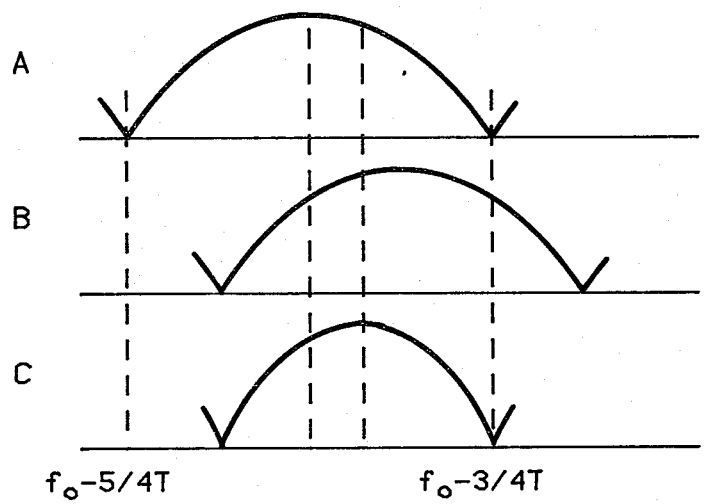
FIGS. 3, A, B and C, are graphic representations of an MSK signal spectrum.

The above discussion can be further examined by looking at the frequency domain characteristics. Referring to FIG. 3, waveform A illustrates the spectrum of the bi-phase signal, waveform B illustrates the frequency response of the filter, and waveform C illustrates the resulting MSK output. The bi-phase spectrum (waveform A) has the form:

$$H(f)_{BP} = \frac{\sin (\pi T (f - f_1))}{\pi T (f - f_1)}$$

The frequency response of the filter (waveform B) has the form:

$$H(f)_F = \frac{\sin (\pi T (f - f_2))}{\pi T (f - f_2)}$$

The resulting MSK output spectrum (waveform C) is given by:

$$H(f)_{MSK} = \frac{\cos (2\pi T (f - f_o))}{1 - (4T(f - f_o))^2}$$

where $f_o$ is the center of the MSK spectrum.

Figure 2:
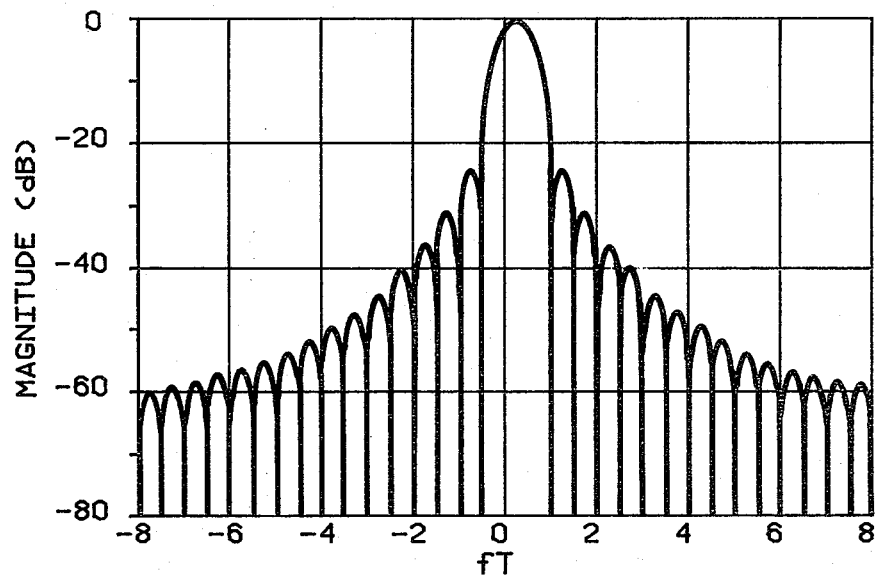
FIG. 2 is a graphic representation of an ideal MSK power spectrum for the apparatus illustrated in FIG. 1.

The main lobe of the MSK signal contains 99 percent of the total signal power, and therefore only the main lobe would usually be transmitted. Thus, in synthesizing the conversion filter the main interest is to reproduce the main lobe of the MSK spectrum, as seen in FIG. 2, accurately since it contains 99 percent of the energy. The structure illustrated in FIG. 4 is an embodiment of an MSK modulator including a synthesized conversion filter subsequent to the bi-phase modulator.

Figure 4:
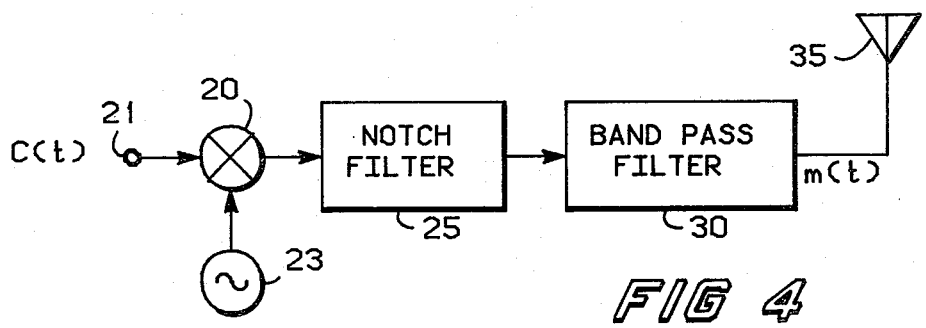
FIG. 4 is a block diagram of a serial minimum shift keyed modulator embodying the present invention.

Referring specifically to FIG. 4, a conventional bi-phase modulator 20 may be a mixer, multiplier, or any device commonly used as a modulator. The modulator 20 includes an input connected to an input terminal 21, which terminal 21 is adapted to receive a serial bit stream of data at relatively high data rates, i.e. in excess of 100 megabits per second. A second input of the modulator 20 is connected to a local oscillator 23, which local oscillator operates at the same frequency as that specified for the local oscillator 13 in FIG. 1. The bi-phase modulated signal from the modulator 20 is applied to a notch filter 25. The output of the notch filter 25 is applied to a band pass filter 30 and the output thereof is applied to a transmission antenna 35. While the notch filter 25 and band pass filter 30 are illustrated in a specific order (i.e. notch filter 35 and then band pass filter 30), it will be understood by those skilled in the art that the apparatus actually used might be interchanged or even intermixed to some extent and it is only essential that the functions of notch and band pass filtering be performed and that the order of performance is immaterial.

A careful examination of FIG. 3 indicates that a good approximation of the conversion filter 15 can be made if the notch filter 25 is constructed so that the notch is approximately at the frequency $f_o - \frac{3}{4}T$. Several embodiments of a synthesized conversion filter were constructed and each was found to operate satisfactorily. In a first embodiment a notch filter at $f_o - \frac{3}{4}T$ and a second order Butterworth filter centered at $f_o$ were used. A second embodiment included a double stub tuner with notches at $f_o - \frac{3}{4}T$ and $f_o + 5/4T$ in cascade with a fourth order Butterworth filter centered at $f_o + \frac{1}{4}T$. In a third embodiment a double stub tuner with notches at $f_o - \frac{3}{4}T$ and $f_o + 5/4T$ and second order Butterworth filter centered at $f_o$ were used to approximate the conversion filter 15. The third synthesized version is similar to the second embodiment except that the center frequency of the Butterworth filter is moved to the center of the MSK spectrum. Therefore, for an ideal MSK spectrum, the third embodiment of the simulated filter will attenuate the side lobes on each side of the main lobe equally. This permits the use of a lower order Butterworth filter to obtain the same side lobe levels as the second embodiment.

Figure 5:
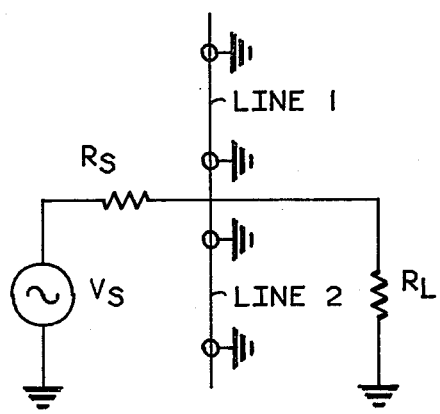
FIG. 5 is a schematic diagram of a double-stub tuner and the circuit used to determine the transfer function thereof.
Figure 6:
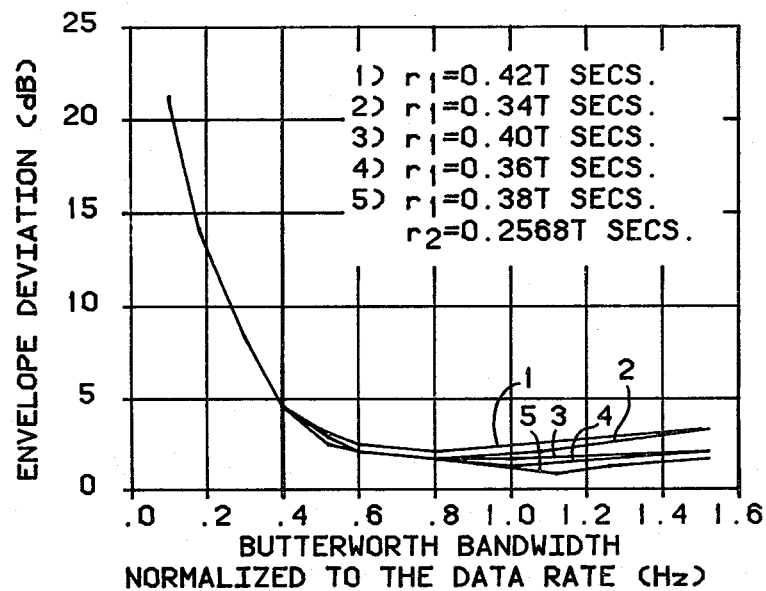
FIGS. 6 and 7 are graphic representations of the envelope deviation versus bandwidth for various modifications of the structure illustrated in FIG. 4.
Figure 7:
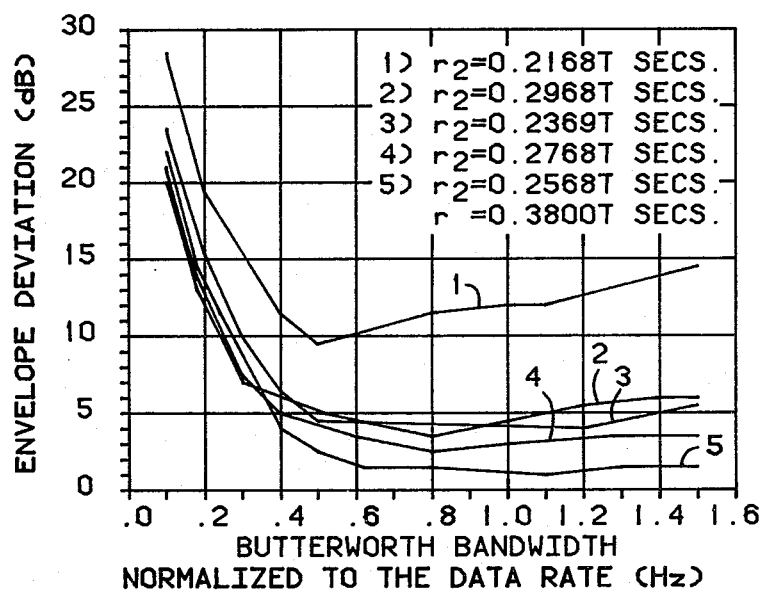

A diagram of a circuit used to determine the transfer function for a double stub tuner is illustrated in FIG. 5. In FIG. 5 the stubs, indicated line 1 and line 2, form the double stub tuner and the resistor $R_L$ is a load resistor while the resistor $R_S$ is a source or current limiting resistor. Both $R_S$ and $R_L$ are 50 ohm resistors in the present embodiment because the impedance of the lines is 50 ohms. Both of the lines produce a round trip delay which is designated $\tau_1$ for line 1 and $\tau_2$ for line 2. It was found during experimentation that the round trip delays ($\tau_1$ and $\tau_2$) not only affect the position of the notches but also the phase and magnitude of the transfer function. The characteristic impedance of the lines can be used to adjust the phase and magnitude of the transfer function. Referring to FIGS. 6 and 7, the effects on the envelope deviation versus bandwidth of different round trip delays for $\tau_1$ and $\tau_2$ is illustrated.

Standard Butterworth filters were used as the bandpass filter because of the ease of obtaining these filters in a variety of orders. However, it will be understood by those skilled in the art that different band pass filter might be utilized and that the Butterworth filters mentioned are simply examples of standard filter types. It was determined through experimentation that the order, center frequency and bandwidth of the band pass filter not only affects the sidelobes of the MSK spectrum, but also the magnitude and phase of the main lobe.

Thus, some minor adjustments in the type of notch filter, number of notches, and position of the notches may be required, as well as the order, center frequency and bandwidth of the band pass filter so as to provide the desired performance characteristics. The major performance characteristics used to evaluate the SMSK modulator with synthesized conversion filter were: the resulting envelope degradation for the approximated SMSK signal; and the BER performance degradation, which is the additional signal-to-noise ratio (SNR) that must be added to the theoretical SNR to obtain a desired probability of error ($P_E$). The percentage of the total energy located in the main lobe of the power spectrum was also incidentally evaluated.

In a typical example of the structure of FIG. 4, a double stub tuner is used as the notch filter 25 and a Butterworth filter is used as the band pass filter 30. The input parameters for the two filters, which parameters determine the transfer function of the synthesized conversion filter, are as follows:

$\tau_1 = 0.3800T$ seconds;
$\tau_2 = 0.2568T$ seconds;
$Z_o = 50$ ohms;
Order of Butterworth filter, $N = 2$;
FTCN $= 2.447/T$ Hz;
BW $= 1.1/T$ Hz; and
FTC $= 0.25/T$ Hz.

where FTCN is the frequency shifting factor that is directly related to $\tau_1$ and $\tau_2$, and FTC is the center frequency of the Butterworth filter.

The baseband frequence response of the double-stub tuner is equal to the frequency response of its complex envelope (for narrowband signals). This frequency response is found by shifting the frequency response of the double-stub tuner for frequencies greater than zero to the origin. By performing this shifting, the following relationship between the round trip time delays of the double-stub tuner ($\tau_1$ and $\tau_2$) and the BPSK carrier ($f_o$) and data rate ($1/T$) can be generated. Note the assumption that $\tau_1$ produces the upper notch of the double-stub tuner was made.

$$\tau_1 = nT = \frac{a}{2(f_o + 5/4T)} \quad (a1)$$

and $$\tau_2 = mT = \frac{b}{2(f_o - 3/4T)} \quad (a2)$$

where
$a \geq b$
and
$a = 1, 3, 5, 7, \ldots$
$b = 1, 3, 5, 7, \ldots$

Since the frequency response must be shifted down to the origin, a shifting factor (FTCN) must be introduced. By knowing that the lower notch for the baseband frequency response must be at $fT = -0.5$, the following equation can be written for FTCN:

$$FTCN = (a+m)/2m \quad (a3)$$

By using Equations (a1) to (a3), the following baseband frequency response for a double-stub tuner whose source and load impedances are $50\Omega$ can be generated:

$$H(f) = \frac{1}{2 + j\frac{50}{Z_o} |\tan[\pi\tau_1(f + FTCN)] + \tan[\pi\tau_2(f + FTCN)]|}$$

where $Z_o$ is the characteristic impedance for the lossless transmission lines.

Figure 8:
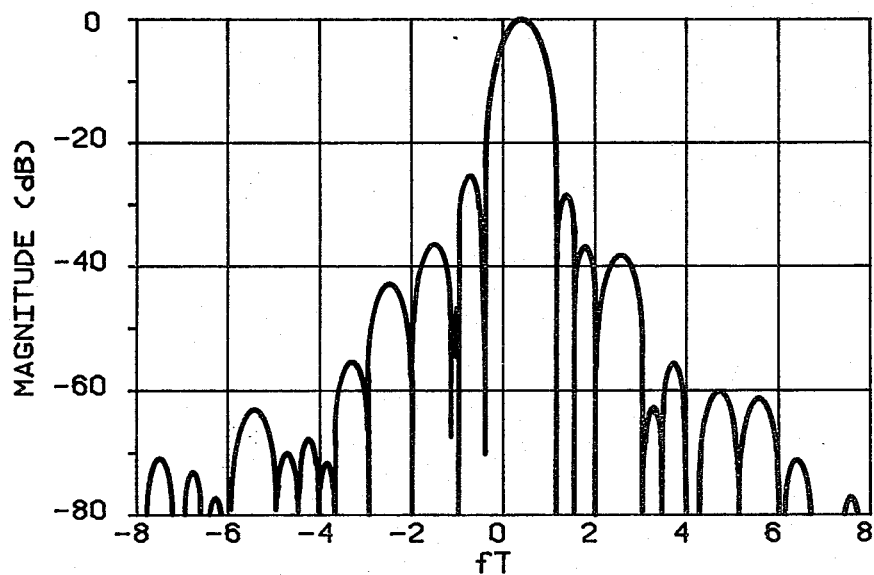
FIG. 8 is a graphic representation of the power spectrum for the apparatus illustrated in FIG. 4.
Figure 9:
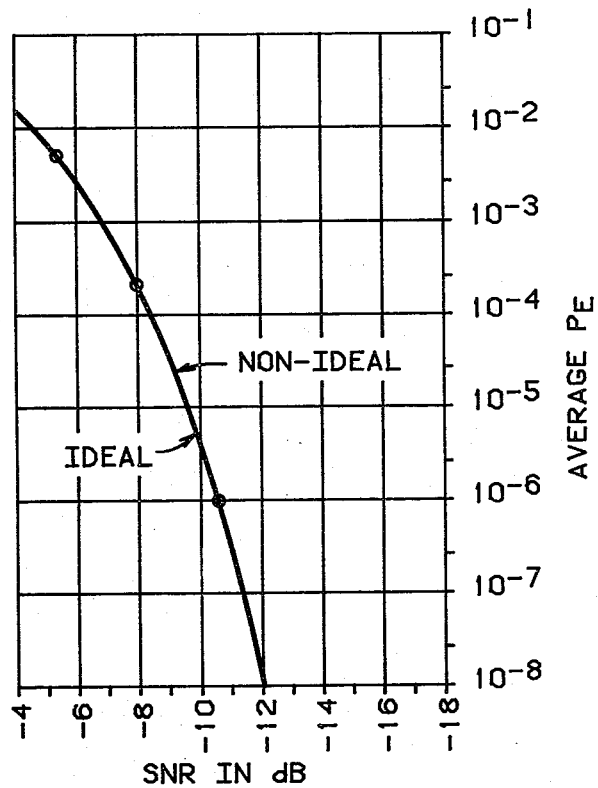
FIG. 9 is a graphic representation of a bit error rate curve comparing the apparatus of FIG. 4 to the apparatus of FIG. 1.

A plot of the power spectrum for the SMSK system using the above described filters is illustrated in FIG. 8. A comparison of the power spectrum plot of FIG. 8 with the power spectrum plot of FIG. 2 shows that the main lobe of the MSK spectrum generated by the above described SMSK system is very close to the main lobe of the power spectrum generated by the ideal conversion filter 15 of FIG. 1, while the amount of energy in the sidelobes is reduced considerably. This reduction in sidelobe energy should produce less adjacent channel degradation for the described SMSK modulator for moderate frequency separation between channels (e.g. for separations of the frequency spectra of the order of two). The probability of error ($P_E$) versus SNR curve illustrated in FIG. 9 verifies the fact that the curves for the above described SMSK modulator and the modulator disclosed in FIG. 1 are very close.

Thus, an improved SMSK modulator utilizing a synthesized conversion filter is disclosed. The synthesized conversion filter is very simple and inexpensive to construct and is more suited for high data rates. Also, the filters utilized do not impose the losses inherent with surface acoustic wave devices and may be easily implemented in lumped-element or stripline form. In addition, the modulator 20 can be a much lower grade multiplier than the type of multipliers required in the conventional parallel MSK modulator.

As illustrated in FIG. 1, a serial MSK modulator consists of biphase modulation of the data C(t) on a carrier of frequency $f_1 = f_0 - \frac{1}{4}T$, T being the bit period of C(t), followed by a band pass conversion filter with impulse response $$h(t) = \begin{cases} \sin 2\pi f_2 t, & 0 \leq t \leq T \\ 0, & \text{otherwise} \end{cases} \quad (1)$$

where $f_2 = f_o + \frac{1}{4}T$.

Consistent with previously used terminology, $f_1$, $f_2$ and $f_o$ will be referred to as the mark, space and apparent carrier frequencies, respectively. The output of the MSK modulator is a sinusoid of frequency $f_1$ if C(t) is an all 1's or all 0's sequence, and a sinusoid of frequency $f_2$ if C(t) is an alternating 1-0 sequence.

Figure 10:
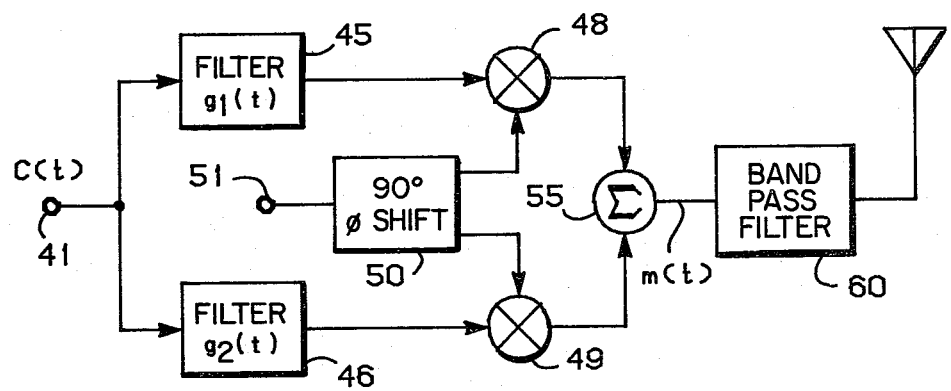
FIG. 10 is a block diagram of another embodiment incorporating the present invention.

In some instances it is desirable to implement the bandpass conversion serial MSK modulator as a low-pass equivalent. To this end, the serial modulator of FIG. 1 is replaced with the in-phase/quadrature (I/Q) mixer, low-pass filter structures of FIG. 10. From an implementation standpoint, this approach has the following advantageous features:

(1) The low-pass filters may be easier to realize at high data rates than bandpass filters, and (2) The sensitivity of the structure of FIG. 10 is not as great as for the conventional parallel structures, thus allowing the use of monolithic integrated circuits.

Referring specifically to FIG. 10, an input terminal 41 adapted to receive a serial bit stream of data, C(t) is connected to an input of each of two low pass filters 45 and 46. Filter 45 provides a first input to a multiplier 48 and filter 46 provides a first input to a second multiplier 49. Each of the multipliers 48 and 49 receive a second input from a phase shifting circuit 50. The circuit 50 has an input terminal 51 adapted to be connected to a frequency source such that the signals applied to the multipliers 48 and 48 are $$\cos(2\pi f_1 t)$$

and $$\sin(2\pi f_1 t),$$

respectively. The outputs of the multipliers 48 and 49 are applied to two inputs of a combining circuit 55. The output of the combining circuit 55 is the MSK signal, m(t).

The following demonstrates that the structures of FIGS. 1 and 10 can be made equivalent, and discusses the properties of the low-pass filters in the I/Q mixer arms.

In showing the equivalences of the structures of FIGS. 1 and 10, it is convenient to use complex envelope notation. For example, for the serial modulator structure, the bi-phase modulator output, or conversion filter input, in FIG. 1 is represented as $$x(t) = \text{Re} \, d(t) e^{j\omega_1 t} \tag{2}$$

where $$\omega_1 = 2\pi f_1 = 2\pi (f_o - \tfrac{1}{4}T) \tag{3}$$

Also the conversion filter, or MSK modulator, output is represented as $$m(t) = \text{Re} \, \tilde{m}(t) e^{j\omega_1 t} \tag{4}$$

and the conversion filter impulse response as $$g(t) = 2\text{Re} \, \tilde{g}(t) e^{j\omega_1 t} \tag{5}$$

where $\tilde{m}(t)$ and $\tilde{g}(t)$ are their respective complex envelopes. With these representations, it can be shown that $$\tilde{m}(t) = d(t) * \tilde{g}(t) \tag{6}$$
$$= d(t) * g_R(t) + j \, d(t) * g_I(t)$$

where * denotes convolution and the subscripts R and I denote the real and imaginary parts, respectively, of the subscripted quantity. Using (6) in (4), $$m(t) = d(t) * g_R(t) \cos \omega_1 t - d(t) * g_I(t) \sin \omega_1 t \tag{7}$$

is obtained as the output of the serial MSK modulator.

Turning now to the parallel I/Q structure of FIG. 10, it follows directly from the block diagram that $$m'(t) = d(t) * g_1(t) \cos(2\pi f_1 t) + d(t) * g_2(t) \sin(2\pi f_1 t) \tag{8}$$

The equivalence of the two structures requires that $m(t) \equiv m'(t)$ which in turn requires that $$g_1(t) = \text{Re} \, \tilde{g}(t) \tag{9a}$$
$$= g_R(t)$$

and $$g_2(t) = -\text{Im} \, \tilde{g}(t) \tag{9b}$$
$$= -g_I(t)$$

It follows, therefore, that $$\tilde{g}(t) = g_1(t) - j g_2(t) \tag{10}$$

and that the equivalent low-pass transfer function of the conversion filter is $$\tilde{G}(f) \triangleq F[\tilde{g}(t)] = G_R(f) + j \, G_I(f) \tag{11}$$
$$= G_1(f) - j \, G_2(f)$$

where F[.] denotes the Fourier transform and $G_R(f) = /F[g_R(t)]$, etc.

Now, from (1), the ideal conversion filter has impulse response $$g(t) = \begin{cases} 2\sin[2\pi(f_o + 1/4T)t], & 0 \leq t \leq T \\ 0, & \text{otherwise} \end{cases} \tag{12}$$

$$= 2\cos[2\pi(f_o + 1/4T)t - \pi/2]\pi(t/T - 0.5)$$

$$= \text{Re}[2 \exp[j2\pi(t/2T - 0.25)]]$$
$$\exp[j2\pi(f_o - 1/4T)t]\pi(t/T - 0.5)]$$

where $(t) \triangleq 1, \tfrac{1}{2} \leq t \leq \tfrac{1}{2}$ and is zero otherwise. Equating (12) to (5) and separating $\tilde{g}(t)$ into its real and imaginary parts, obtains $$g_R(t) = \cos 2\pi(t/2T - 0.25)\pi(t/T - 0.5) \tag{13a}$$
$$= \sin(\pi t/T)\pi(t/T - 0.5)$$

and $$g_I(t) = \sin 2\pi(t/2T - 0.25)\pi(t/T - 0.5) \tag{13b}$$
$$= -\cos(\pi t/T)\pi(t/T - 0.5)$$

The Fourier transforms of (13a) and of the negative of (13b) result in the transfer functions, $G_1(f)$ and $G_2(f)$, of the in-phase and quadrature low-pass conversion filters of FIG. 10. By using the Fourier transform pair $$(t/T) \longleftrightarrow T \sin c(fT) \tag{14}$$

where $\sin c(u) \triangleq \sin(\pi u)/(\pi u)$ and appropriate Fourier transform theorems, these transfer functions are found to be $$G_1(f) = 0.5T[\sin c(fT - 0.5) + \sin c(fT + 0.5)] \exp(-j\pi fT) \tag{15a}$$

and $$G_2(f) = j0.5T[\sin c(fT - 0.5) - \sin c(fT + 0.5)] \exp(-j\pi fT), \tag{15b}$$

respectively. From (11) and the expressions above for $G_1(f)$ and $G_2(f)$, the equivalent low-pass transfer function of the conversion filter is $$G(f) = T \sin c(fT - 0.5) \exp(-j\pi fT) \tag{16}$$

Figure 11:
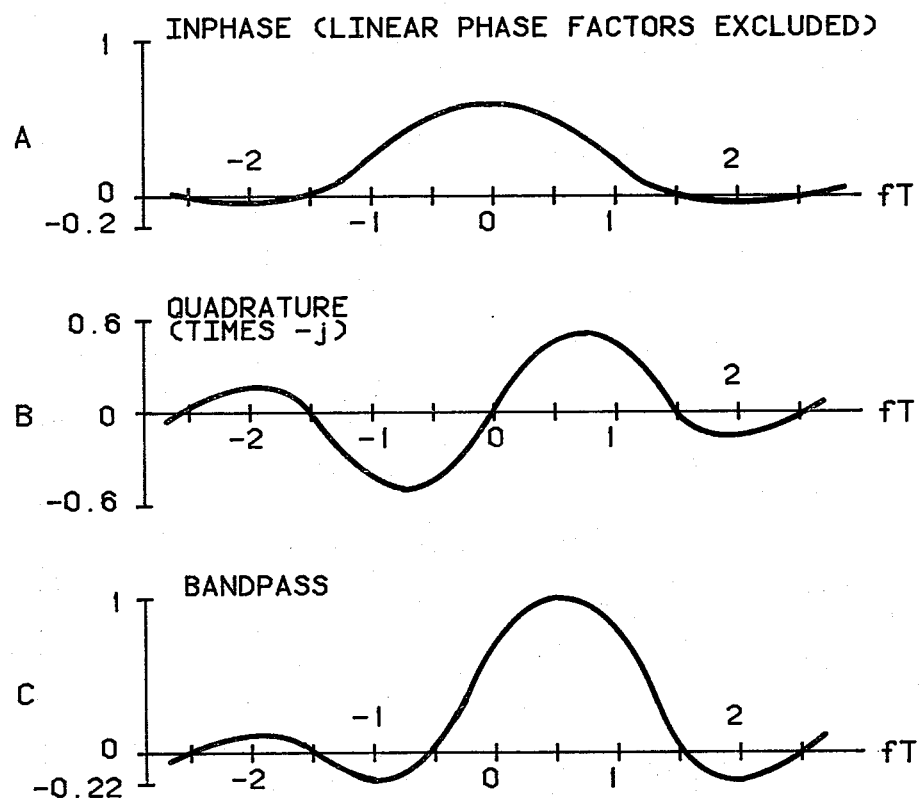
FIGS. 11 A, B and C are graphic representations of frequency response functions for the embodiment of FIG. 10.

These ideal conversion filter transfer functions are compared in FIG. 11. Note that the transfer function, $G_R(f)$, of the in-phase arm filter is low-pass and an even function of frequency and that the transfer function, $G_I(f)$, of the quadrature-arm filter is high-pass and an odd function of frequency. They add in phase quadrature to produce a bandpass conversion filter frequency response with even symmetry about the frequency $f_2=f_o+\frac{1}{4}T$. (Recall that $f_1=f_o-\frac{1}{4}T$ has been used as the reference frequency for the complex envelope representation so that $f_1$ corresponds to $fT=0$ in the graphs of the low-pass equivalent transfer functions of FIG. 11.) The addition of $G_1(f)$ and $G_2(f)$ in phase quadrature produces the required bandpass equivalent transfer function. The filters 45 and 46 operate essentially like a double notch filter. Also, the filters 45 and 46 provide at least some of the functions of a bandpass filter. However, the addition of a bandpass filter subsequent to the biphase modulation in the multipliers 48 and 49 reduces the requirements of the other components in the circuit.

Consider the open and shorted transmission lines driven by sources with internal impedance $R_1$ matched to the characteristic impedance of the line. The transfer function of this configuration is $$H(\lambda) \triangleq \frac{E_0}{R_1 I} \frac{1}{1 + R_1/Z_L} \tag{27}$$

where $Z_L$ is the driving point impedance of the line. For the open line, $$Z_L = -jZ_O \cot \beta l \tag{28}$$

where $\beta = 2\pi/\lambda = 2\pi f/c$, c being the velocity of electromagnetic propagation on the line, and $Z_O$ is the characteristic impedance of the line. For the shorted line $$Z_L = jZ_O \tan \beta l \tag{29}$$

Therefore, if $R_1 = Z_O$, the transfer function of the open line configuration is $$H_O(f) = \frac{1}{1 + j \tan (2\pi f l/c)} \tag{30}$$
$$= \cos (2\pi k f T) \exp (-j2\pi k f T)$$

and that of the shorted line configuration is $$H_S(f) = \frac{1}{1 + j \cot (2\pi f l/c)} \tag{31}$$
$$= j \sin (2\pi k f T) \exp (-j2\pi k f T)$$

where $k = l/cT$ is the line delay in bit periods.

If an open line is used in the in-phase arm of the I/Q modulator structure for the filter 45 and a shorted line is used in the quadrature arm for the filter 46, the low-pass equivalent transfer function of this portion of the conversion filter is $$G_{TL}(f) = H_O(f) - j H_S(f) \tag{32}$$
$$= [\cos (2\pi k f T) + \sin (2\pi k f T)] \exp (-j2\pi k f T)$$
$$= \sqrt{2} \cos (2\pi k f T - \pi/4) \exp (-j2\pi k f T)$$

If $k = 0.5$, the zeros of $T_{TL}(f)$ adjacent to $fT = 0$ match the mainlobe zeros of the ideal conversion filter frequency response. Suppression of the unwanted lobes of the periodic transfer function given by (32) by a bandpass filter 60 placed at the output of the combining circuit 55 then results in an approximation for the ideal conversion filter. Tests indicate that the optimum filter bandwidth is approximately 1 data rate. For a 1 data rate bandwidth, the degradation at a BER of $10^{-6}$ is about 0.43 dB, which is comparable to the quadrature-hybrid implemented conversion filter. As in the case of the quadrature-hybrid conversion filter, the mainlobe of the spectrum closely approximates the mainlobe of the ideal MSK spectrum; however, the sidelobes are considerably lower. While the bandpass filter is optional in this embodiment it improves the output signal by reducing interference due to asymmetric signals and allows the other components of the circuit to be reduced in tolerance.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

I claim:

1. A serial minimum-shift keyed modulator comprising:
   (a) biphase modulator means having a first input for receiving a serial bit stream of data, a second input for receiving a relatively high frequency carrier, and an output for supplying the carrier biphase modulated by the serial bit stream;
   (b) a conversion filter coupled to said biphase modulator means and providing a minimum-shift keyed signal, said conversion filter including
      (1) a notch filter having a notch adjacent to the carrier frequency and in the frequency spectrum of the biphase modulator, and
      (2) a bandpass filter having a bandpass positioned to extend above and below the carrier frequency for the biphase modulated carrier, said notch and bandpass filters being coupled together to form the conversion filter.

2. A serial minimum-shift keyed modulator comprising:
   (a) biphase modulator means having a first input for receiving a serial bit stream of data, a second input for receiving a relatively high frequency carrier, and an output having thereon the carrier biphase modulated by the serial bit stream; and
   (b) a conversion filter connected to said biphase modulator means and providing a minimum-shift keyed signal, said conversion filter including
      (1) a notch filter having a notch at approximately $f_o - \frac{3}{4}T$, and
      (2) a bandpass filter having a bandpass positioned to attenuate sidelobes on either side of a mainlobe, where $f_o$ is the carrier frequency for the biphase modulated carrier and T is the bit period of the bit stream, said notch and bandpass filters being coupled together to form the conversion filter.

3. A serial minimum-shift keyed modulator as claimed in claim 2 wherein the biphase modulator means includes a multiplier.

4. A serial minimum-shift keyed modulator as claimed in claim 2 wherein the notch filter includes a double-stub tuner.

5. A serial minimum-shift keyed modulator as claimed in claim 4 wherein the double-stub tuner has a second notch at approximately $f_o + 5/4T$.

6. A serial minimum-shift keyed modulator as claimed in claim 5 wherein the bandpass filter is a fourth-order Butterworth filter constructed so that the bandpass is centered at approximately $f_o + \frac{1}{4}T$.

7. A serial minimum-shift keyed modulator as claimed in claim 2 wherein the bandpass filter is a second-order Butterworth filter having a bandpass centered at approximately $f_o$.

8. A serial minimum-shift keyed modulator as claimed in claim 2 wherein the bandpass filter includes a Butterworth filter.

9. In a serial minimum-shift keyed modulator of the type including a biphase modulator for biphase modulating a carrier with a serial bit stream and a conversion filter for converting the biphase modulated signal to a minimum-shift keyed signal, a method of synthesizing the conversion filter comprising the steps of:
 (a) providing a notch filter with a notch frequency in the frequency spectrum of the biphase modulated signal;
 (b) providing a bandpass filter, the bandpass of which extends on either side of the frequency of the carrier;
 (c) connecting the notch filter and the bandpass filter to provide an input and an output of said conversion filter; and
 (d) selecting the number and frequency position of notches of the notch filter and selecting the type, center frequency, and bandwidth of the bandpass filter to optimize the envelope amplitude variations and the bit error rate.

10. In a serial minimum-shift keyed modulator of the type including a biphase modulator for biphase modulating a carrier with a serial bit stream and a conversion filter for converting the biphase modulated signal to a minimum-shift keyed signal, a method of synthesizing the conversion filter comprising the steps of:
 (a) providing a notch filter with a notch frequency in the frequency spectrum of the biphase modulated signal;
 (b) providing a bandpass filter, the bandpass of which extends on either side of the frequency of the carrier;
 (c) connecting the notch filter and the bandpass filter to provide an input and an output of said conversion filter; and
 (d) selecting the number and frequency position of notches of the notch filter and selecting the type, center frequency, and bandwidth of the bandpass filter to provide a minimum-shift keyed signal having a frequency spectrum and a center lobe approximately equal in magnitude and width to the center lobe of a conversion filter having an impulse response $$h(t) = \begin{cases} \sin 2\pi \left( f_o + \frac{1}{4T} \right) t & \text{for } 0 < t < T \\ 0 & \text{elsewhere} \end{cases}$$

* * * * *